(12) United States Patent
Tanno (10) Patent No.: US 8,910,681 B2
(45) Date of Patent: Dec. 16, 2014

(54) NOISE REDUCING DEVICE, MANUFACTURING METHOD FOR THE NOISE REDUCING DEVICE, AND PNEUMATIC TIRE HAVING THE NOISE REDUCING DEVICE

(71) Applicant: The Yokohama Rubber Co., Ltd., Tokyo (JP)

(72) Inventor: Atsushi Tanno, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/711,171

(22) Filed: Dec. 11, 2012

(65) Prior Publication Data

US 2013/0098522 A1 Apr. 25, 2013

Related U.S. Application Data

(62) Division of application No. 11/919,183, filed as application No. PCT/JP2006/308851 on Apr. 27, 2006, now Pat. No. 8,342,289.

(30) Foreign Application Priority Data

Apr. 28, 2005 (JP) ................. 2005-131939

(51) Int. Cl.
  *B60C 5/00* (2006.01)
  *B60C 19/00* (2006.01)
  *B29D 30/06* (2006.01)
  *B29C 65/00* (2006.01)

(52) U.S. Cl.
  CPC .......... *B29D 30/0681* (2013.01); *B60C 19/002* (2013.04); *B60C 5/00* (2013.01); *B29C 66/71* (2013.01)
  USPC ............................ 152/157; 152/450; 181/207

(58) Field of Classification Search
  USPC ............................... 152/157, 155, 450; 295/7
  IPC ................................................ B60C 5/00,19/00
  See application file for complete search history.

(56) References Cited

U.S. PATENT DOCUMENTS

| 2,040,645 | A | 5/1936 | Dickinson |
| 4,031,940 | A | 6/1977 | Bartley et al. |

(Continued)

FOREIGN PATENT DOCUMENTS

| DE | 198 06 935 | 9/1999 |
| GB | 1 359 468 | 7/1974 |

(Continued)

OTHER PUBLICATIONS

Office action issued in U.S. Appl. No. 12/422,548 dated May 6, 2011.

(Continued)

*Primary Examiner* — Richard Crispino
*Assistant Examiner* — Philip N Schwartz
(74) *Attorney, Agent, or Firm* — Greer Burns & Crain, Ltd.

(57) ABSTRACT

A pneumatic tire including a noise reduction device in a cavity portion thereof. The noise reduction device has a noise absorbing member formed of a porous material; a band member for attaching the noise absorbing member to the inner surface of a tire; and locking members formed of a thermoplastic resin. Preferably, the band member is formed of a thermoplastic resin, and the noise absorbing member is disposed between the band member and the locking members. Also, the locking members are bonded to the band member through the noise absorbing member by thermal fusion, and the constituent material of the band member and the constituent material of the locking members are the same thermoplastic resin.

19 Claims, 10 Drawing Sheets

(56) References Cited

U.S. PATENT DOCUMENTS

| | | |
|---|---|---|
| 4,096,898 A | 6/1978 | Messerly et al. |
| 4,216,812 A | 8/1980 | Bourne |
| 4,287,930 A | 9/1981 | McIntosh et al. |
| 4,340,104 A | 7/1982 | Kuan |
| 4,681,147 A | 7/1987 | Hugele |
| 5,658,987 A | 8/1997 | Nakamura et al. |
| 6,217,683 B1 | 4/2001 | Balzer et al. |
| 6,538,066 B2 | 3/2003 | Watanabe et al. |
| 6,726,289 B2 | 4/2004 | Yukawa et al. |
| 7,455,092 B2 | 11/2008 | Yukawa et al. |
| 7,490,644 B2 | 2/2009 | Yukawa |
| 7,677,286 B2 | 3/2010 | Tanno |
| 2003/0111156 A1 | 6/2003 | McNichols et al. |
| 2005/0046978 A1 | 3/2005 | Schofield et al. |
| 2005/0205183 A1 | 9/2005 | Yukawa |
| 2005/0247391 A1 | 11/2005 | Ikuta |
| 2005/0275277 A1 | 12/2005 | Yukawa |
| 2006/0108042 A1 | 5/2006 | Yukawa et al. |
| 2007/0199636 A1 | 8/2007 | Tanno |
| 2009/0199942 A1 | 8/2009 | Tanno |
| 2009/0242094 A1 | 10/2009 | Kato et al. |
| 2009/0314402 A1 | 12/2009 | Kuramori et al. |
| 2009/0314403 A1 | 12/2009 | Tanno |
| 2009/0320980 A1 | 12/2009 | Tanno |
| 2010/0032073 A1 | 2/2010 | Tanno et al. |

FOREIGN PATENT DOCUMENTS

| | | | | |
|---|---|---|---|---|
| JP | 62-216803 | 9/1987 | | |
| JP | 64-78902 | 3/1989 | | |
| JP | 64-078902 | 3/1989 | | |
| JP | 4-159101 | 6/1992 | | |
| JP | 06-106903 | * 4/1994 | ............. | B60B 21/12 |
| JP | 8-217923 | 8/1996 | | |
| JP | 9-086112 | 3/1997 | | |
| JP | 2001-113902 | 4/2001 | | |
| JP | 2003-063208 | 3/2003 | | |
| JP | 2003-226104 | 8/2003 | | |
| JP | 2004042822 | 2/2004 | | |
| JP | 2004-291855 | 10/2004 | | |
| JP | 2005-205935 | 8/2005 | | |
| JP | 2005-238888 | 9/2005 | | |
| JP | 2005-262921 | 9/2005 | | |
| JP | 2005-297836 | 10/2005 | | |
| JP | 2006-044503 | 2/2006 | | |
| JP | 2006-306285 | 11/2006 | | |
| WO | WO03/103989 | * 12/2003 | ................ | B60C 5/00 |
| WO | WO 2005/012008 | 2/2005 | | |
| WO | WO 2006/118198 | 11/2006 | | |
| WO | WO 2006/118200 | 11/2006 | | |
| WO | WO 2006/118202 | 11/2006 | | |
| WO | WO 2007/141973 | 12/2007 | | |

OTHER PUBLICATIONS

Office action issued in U.S. Appl. No. 11/919,113 dated Mar. 6, 2012.
Office action issued in U.S. Appl. No. 12/422,548 dated Mar. 9, 2012.
U.S. Appl. No. 11/886,708, filed Sep. 18, 2007.
U.S. Appl. No. 11/919,113, filed Jan. 15, 2009.
U.S. Appl. No. 12/422,548, filed Apr. 13, 2009.
U.S. Appl. No. 11/919,183, filed Sep. 8, 2009.
U.S. Appl. No. 11/919,184, filed Oct. 12, 2009.
U.S. Appl. No. 13/711,121, filed Dec. 11, 2012.
U.S. Appl. No. 12/433,975, filed May 1, 2009.
U.S. Appl. No. 13/895,884, filed May 16, 2013.
U.S. Appl. No. 13/895,820, filed May 16, 2013.

* cited by examiner

NOISE REDUCING DEVICE, MANUFACTURING METHOD FOR THE NOISE REDUCING DEVICE, AND PNEUMATIC TIRE HAVING THE NOISE REDUCING DEVICE

This application is a divisional application of U.S. patent application Ser. No. 11/919,183, filed Sep. 8, 2009.

TECHNICAL FIELD

The present invention relates to a device for reducing cavity resonance sound generated in a pneumatic tire. Specifically, the present invention relates to a noise reduction device with an improved adhesion of a noise absorbing member formed of a porous material and with a reduced processing time, to a method of manufacturing the noise reduction device, and to a pneumatic tire including the noise reduction device.

BACKGROUND ART

One of causes of noise generated in pneumatic tires is cavity resonance sound associated with vibration of the air filled inside a tire. When a tire is rolled, the air inside the tire is vibrated by the vibration of the tread portion due to irregularities of a road surface, which generates this cavity resonance sound.

As means for reducing noise due to the cavity resonance phenomenon, it has been proposed that a noise absorbing member is disposed in a cavity portion formed between a tire and a rim of a wheel (for example, refer to Patent Document 1). However, when the noise absorbing member is attached to the outer peripheral surface of the rim of the wheel, the noise absorbing member interferes with the operation of mounting the pneumatic tire on the rim. Also, when the noise absorbing member is attached to the inner surface of the tire, there is a disadvantage that the attachment work is complicated.

On the other hand, it has been proposed that objects for obtaining noise absorbing effect are attached to a ring-shaped band member, and the objects are installed on an inner surface of the tire in a tread portion based on an elastic force of the band member (for example, refer to Patent Document 2). When such a technique is adopted, the noise absorbing member can be easily installed on the inner surface of the tire. However, when a noise absorbing member formed of, for example, a porous material, such as polyurethane foam, is fixed to a band member by using an adhesive agent or an adhesive tape, the porous material sometimes reacts with a component included in the adhesive agent or the adhesive tape to be decomposed. As a result, the adhesion of the noise absorbing member is deteriorated. For this reason, the means for fixing the noise absorbing member to the band member has an advantage that the means facilitates the attachment of the noise absorbing member to the inner surface of the tire, but is insufficient in terms of the durability. Moreover, the bonding of the noise absorbing member to the band member with the adhesive agent has a disadvantage that it takes a long time for the adhesive agent to set.

Patent Document 1: Japanese patent application Kokai publication No. Sho64-78902

Patent Document 2: Japanese patent application Kokai publication No. 2003-226104

DISCLOSURE OF THE INVENTION

An object of the present invention is to provide a noise reduction device with an improved adhesion of a noise absorbing member formed of a porous material and with a reduced processing time, a method of manufacturing the noise reduction device, and a pneumatic tire including the noise reduction device.

A noise reduction device according to the present invention for the purpose of achieving the object is characterized by including: a noise absorbing member formed of a porous material; a band member for attaching the noise absorbing member to the inner surface of a tire; and locking members formed of a thermoplastic resin. The noise reduction device also has the following characteristics. The band member is formed of a thermoplastic resin. The noise absorbing member is disposed between the band member and the locking members. The locking members are bonded to the band member through the noise absorbing member by thermal fusion.

In addition, a method of manufacturing a noise reduction device according to the present invention for the purpose of achieving the object is a method of manufacturing a noise reduction device including a noise absorbing member formed of a porous material and a band member for attaching the noise absorbing member to the inner surface of a tire. The method is characterized by including: forming the band member of a thermoplastic resin; disposing the noise absorbing member between the band member and locking members formed of a thermoplastic resin, and bonding the locking members to the band member through the noise absorbing member by thermal fusion.

In the present invention, while the band member is formed of a thermoplastic resin, the noise absorbing member is disposed between the band member and the locking members formed of a thermoplastic resin, and the locking members are bonded to the band member through the noise absorbing member by thermal fusion. Accordingly, even when the noise absorbing member is formed of a thermosetting resin, such as polyurethane foam, it is possible to firmly fix the noise absorbing member to the band member. The fixation by thermal fusion bonding does not cause a reduction in adhesive force due to decomposition reaction, unlike the fixation by using an adhesive agent or an adhesive tape. For this reason, it is possible to maintain the bonding state of the noise absorbing member formed of a porous material favorably over a long period of time. In addition, the processing by thermal fusion bonding can be completed for a short period of time, as compared with the processing by using an adhesive agent. As a result, the processing time of the noise reduction device can be reduced.

It is preferable that a constituent material of the band member and a constituent material of the locking members be the same thermoplastic resin, and for example, be polypropylene. Meanwhile, it is preferable that the porous material of the noise absorbing member be polyurethane foam. In other words, since the polyurethane foam exhibits a favorable noise absorbing characteristic, the polyurethane foam is preferable as the constituent material of the noise absorbing member.

In the noise reduction device according to the present invention, each locking member may have a plate shape, or may have a cylindrical shape with a bottom. The locking members having a cylindrical shape with a bottom have an advantage that the locking members are less likely to damage the noise absorbing member formed of a porous material. In addition, through holes may be formed in advance in the noise absorbing member at positions where the noise absorbing member is locked by the locking members. In this case, it is preferable that the noise absorbing member is held in the state of being compressed by the locking members when the locking members are bonded to the band member via the through holes by thermal fusion. This makes it possible to suppress the movements of the noise absorbing member. Moreover, an edge portion of the noise absorbing member may be retained by a fastener formed of a thermoplastic resin, and then the fastener may be bonded to the band member by thermal fusion. This makes it possible to suppress the movements of the edge portions of the noise absorbing member, and to thus prevent the portions from being destructed.

In addition, in the noise reduction device according to the present invention, it is preferable that the width of each locking member be 90 to 300% of the width of the band member, that the width of a thermal-fusion-bonding portion of each locking member and the band member be made narrower than the width of the band member, and that non-fusion-bonding portions, each having a width equivalent to 5 to 20% of the width of the band member, be left on both sides of the thermal-fusion-bonding portion. This makes it possible to firmly fix the noise absorbing member to the band member while securing the durability of the band member. Moreover, it is preferable that the thermal-fusion-bonding portions of the locking members and the band member are arranged at intervals in the tire circumferential direction, and the relation between the interval H and the width W of the noise absorbing member is $0.2W \leq H \leq 4W$. This makes it possible to secure the preferable durability by minimum processing.

In the method of manufacturing a noise reduction device according to the present invention, it is preferable that an ultrasonic welder be used for bonding each locking member and the band member to each other by thermal fusion. In the case of using such an ultrasonic welder, it is possible to locally heat each locking member and the band member. As a result, an excellent balance between the processability and the durability can be achieved. The ultrasonic welder is effective particularly when the constituent material of the band member and the constituent material of the locking members are polypropylene. In addition, by employing, as an oscillating horn for the ultrasonic welder, one having chamfered end portions of a tip in the width direction thereof, it is possible to suppress an occurrence of a whitening phenomenon in the locking members, and thus to further improve the durability.

According to the present invention, provided is a pneumatic tire including the noise reduction device in a cavity portion thereof. In such a pneumatic tire, an excellent noise reduction effect can be obtained due to the noise absorbing member of the noise reduction device, and the noise reduction effect can be maintained over a long period of time.

BRIEF DESCRIPTION OF THE DRAWINGS

FIG. 18(a) is a perspective view showing a state of the noise reduction device before thermal fusion bonding while FIG. 18(b) is a perspective view showing a state of the noise reduction device after the thermal fusion bonding.

FIG. 20(a) is a perspective view showing a state of the noise reduction device before thermal fusion bonding while FIG. 20(b) is a perspective view showing a state of the noise reduction device after the thermal fusion bonding.

BEST MODES FOR CARRYING OUT THE INVENTION

Figure 1:
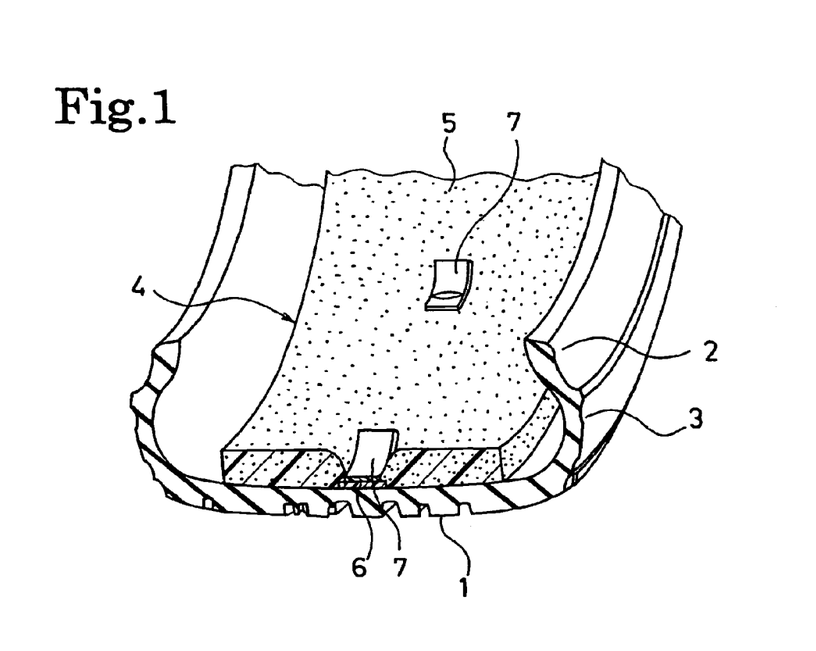
FIG. 1 is a perspective cross-sectional view showing a pneumatic tire according to an embodiment of the present invention.
Figure 2:
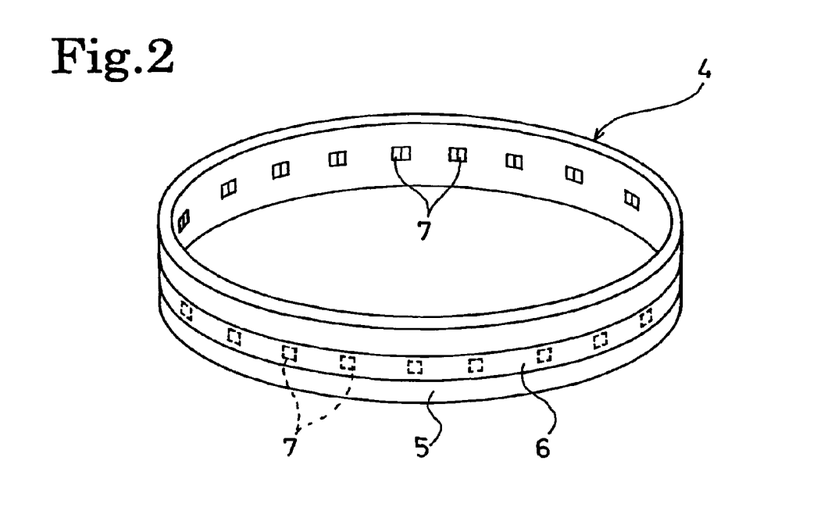
FIG. 2 is a perspective view showing a noise reduction device according to the embodiment of the present invention.

Hereinafter, descriptions will be given in detail of a configuration of the present invention with reference to the accompanying drawings. FIG. 1 shows a pneumatic tire according to an embodiment of the present invention. FIG. 2 shows a noise reduction device according to the embodiment of the present invention. In FIG. 1, a pneumatic tire is provided with a tread portion 1, a pair of left and right bead portions 2, and side wall portions 3. Each of the side wall portions 3 connects the tread portion 1 and a corresponding one of the bead portions 2 to each other. In addition, a ring-shaped noise reduction device 4 shown in FIG. 2 is attached to the inner surface of the tread portion 1.

The noise reduction device 4 is provided with a noise absorbing member 5 formed of a porous material, and a band member 6 for attaching the noise absorbing member 5 to the inner surface of the tire. The noise absorbing member 5 includes a plurality of internal cells so as to have a predetermined noise reduction characteristic associated with the porous structure. As the porous material for the noise absorbing member 5, polyurethane foam may be used. On the other hand, the band member 6 is shaped into a ring in a manner of extending continuously in the tire circumferential direction. The band member 6 holds the noise absorbing member 5 on the inner surface of the tire with the elastic restoring force thereof. The noise reduction device 4 configured as described above is attachable to, and detachable from, general pneumatic tires, and is thus easy to be attached and detached.

In the noise reduction device 4, thermal fusion bonding is employed as means for fixing the noise absorbing member 5 and the band member 6. For enabling the thermal fusion bonding, the band member 6 is formed of a thermoplastic resin. In addition, plate-shaped locking members 7 (locking plates or locking chips) formed of a thermoplastic resin are used. Specifically, the noise absorbing member 5 is arranged between the band member 6 and the locking members 7 formed of the thermoplastic resin. Then, the locking members 7 are bonded to the band member 6 through the noise absorbing member 5 by thermal fusion. As the constituent material of the band member 6 and the constituent material of the locking members 7, the same thermoplastic resin, for example, polypropylene may be used.

Figure 3:
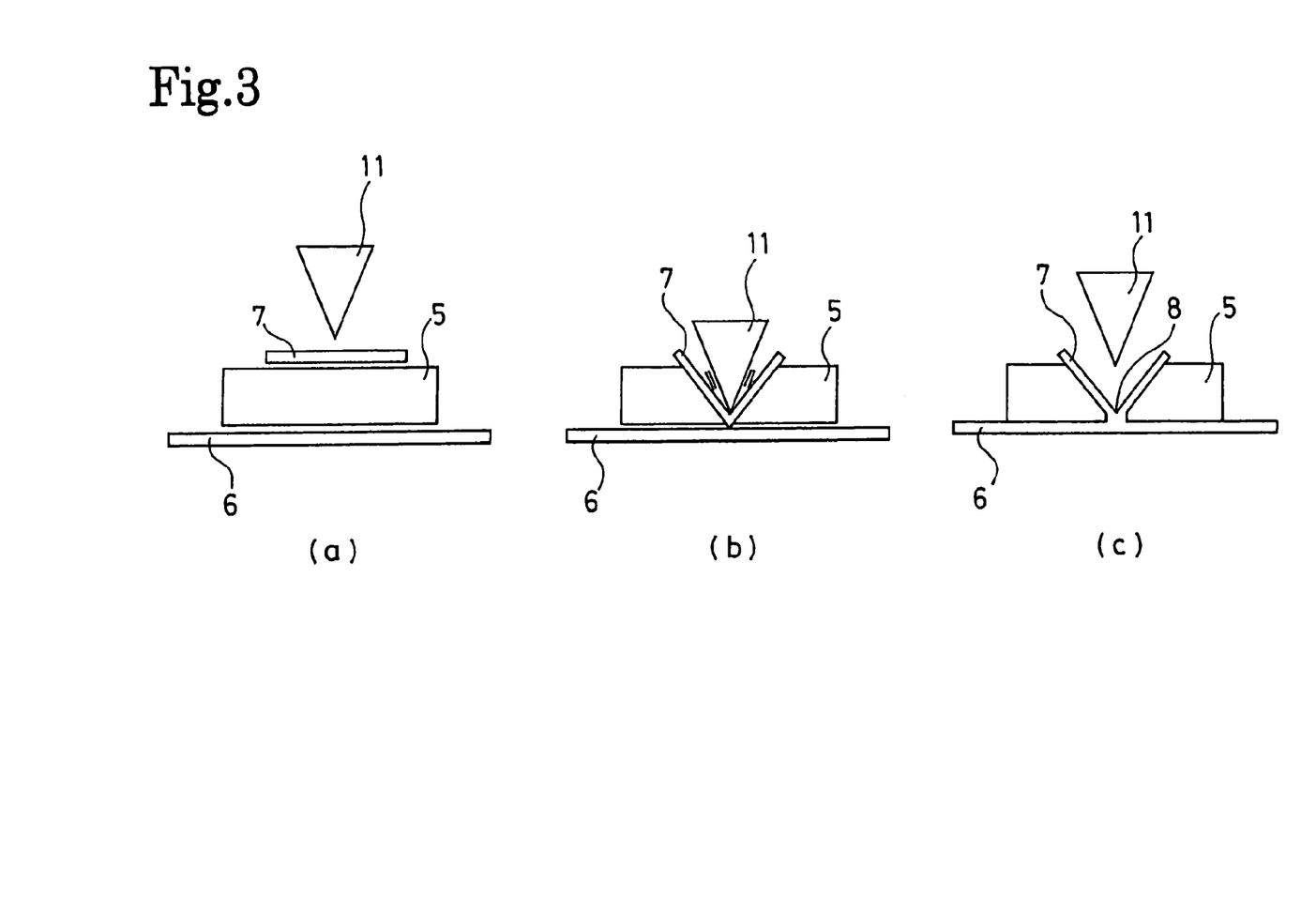
FIG. 3 show an example of a method of thermal fusion bonding between a locking member and a band member, and each of FIGS. 3(a) to 3(c) is a cross-sectional view showing a step of the method.

FIGS. 3(a) to 3(c) show an example of a method of thermal fusion bonding between the locking member and the band member. Firstly, as shown in FIG. 3(a), the noise absorbing member 5 is disposed between the band member 6 and the locking member 7. Thereafter, as shown in FIG. 3(b), an oscillating horn 11 for an ultrasonic welder is pressed against the locking member 7, so that the locking member 7 is bent. Then, the tip portion where the locking member 7 is bent is locally heated. In this manner, as shown in FIG. 3(c), the locking member 7 and the band member 6 are bonded to each other through the noise absorbing member 5 by thermal fusion, so that a thermal-fusion-bonding portion 8 is formed.

Figure 4:
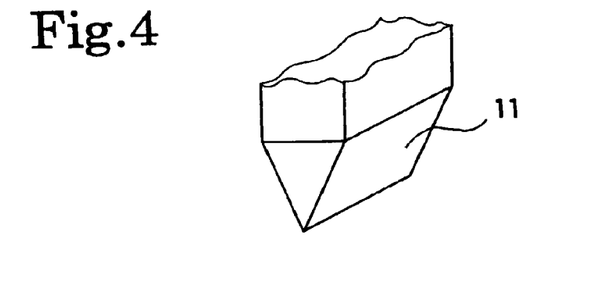
FIG. 4 is a perspective view showing an example of an oscillating horn for an ultrasonic welder.
Figure 5:
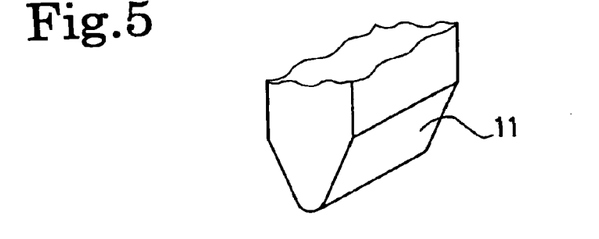
FIG. 5 is a perspective view showing another example of the oscillating horn for the ultrasonic welder.
Figure 6:
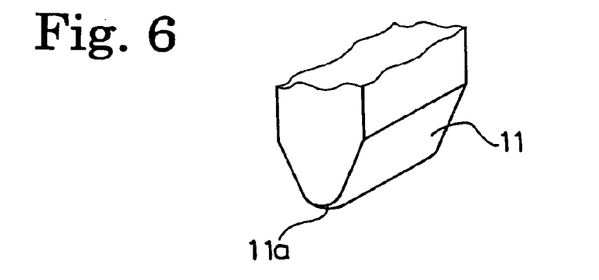
FIG. 6 is a perspective view showing another example of the oscillating horn for the ultrasonic welder.
Figure 7:
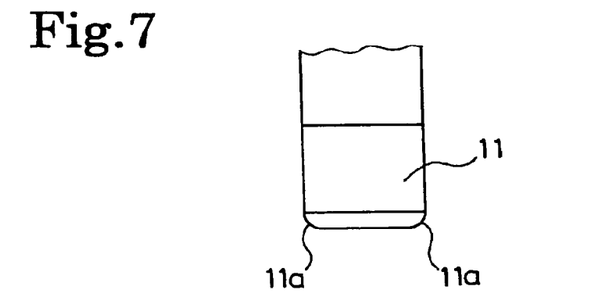
FIG. 7 is a front view of the oscillating horn shown in FIG. 6.

In the thermal fusion bonding using the ultrasonic welder, the shape of the oscillating horn 11 is not particularly limited. For example, the oscillating horns 11 having shapes as shown in FIGS. 4 to 6 may be employed. In FIG. 4, the oscillating horn 11 has a tip processed into a sharp linear shape. In FIG. 5, the oscillating horn 11 has a tip processed into a long and thin rectangular surface. In FIG. 6, the oscillating horn 11 has a tip processed into a long and thin rectangular surface, and further has chamfered portions 11a formed in both end portions of the tip in the width direction thereof. FIG. 7 is a side view of the oscillating horn shown in FIG. 6. It is preferable that the radius of curvature of each chamfered portion 11a be not less than 2 mm. The chamfering of both end portions, in the width direction, of the tip of the oscillating horn 11, makes it possible to suppress an occurrence of a whitening phenomenon in the locking member 7 due to the pressing of the oscillating horn 11.

Figure 8:
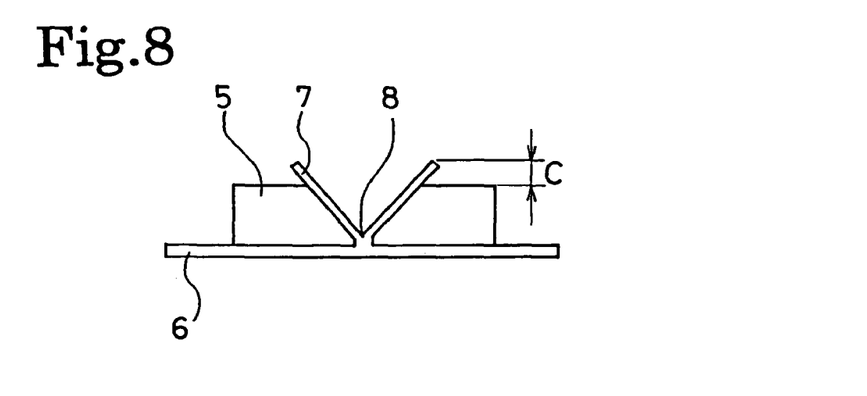
FIG. 8 is a cross-sectional view showing a structure in which thermal fusion bonding is performed on the locking member.
Figure 9:
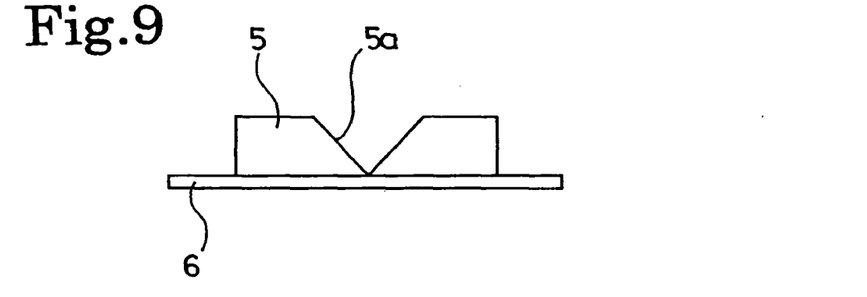
FIG. 9 is a cross-sectional view showing a noise absorbing member to which a notch portion is provided in advance.
Figure 10:
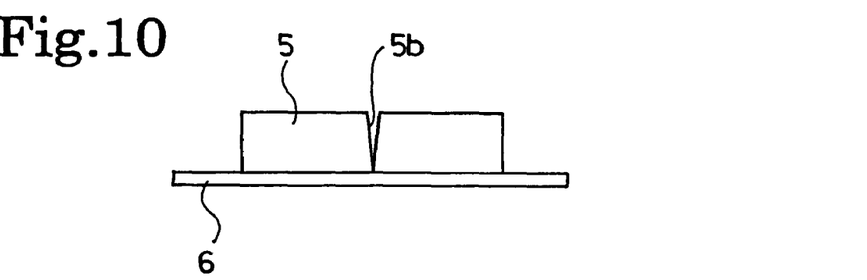
FIG. 10 is a cross-sectional view showing the noise absorbing member to which a cut is provided in advance.

In the thermal fusion bonding using the ultrasonic welder, the dimensions and the shape of the locking member 7 are not particularly limited. The shape of the locking member 7 may be, for example, a quadrangle. In this case, it is preferable to round the corners of the quadrangle. This makes it possible to reduce the damaging of the noise absorbing member 5 by the locking member 7. In addition, as shown in FIG. 8, in a state where the locking member 7 is bonded to the band member 6 by thermal fusion, it is preferable that the clearance C between each end portion of the locking member 7 and the upper surface of the noise absorbing member 5 satisfy $0.5 \text{ mm} \leq C \leq 8.0 \text{ mm}$. When the clearance C is less than 0.5 mm, the noise absorbing member 5 is likely to be damaged by the locking member 7. On the other hand, even when the clearance C is more than 8.0 mm, a better result cannot be obtained than that of a case where the clearance C is 8.0 mm. In addition, a notch portion 5a as shown in FIG. 9 or a cut 5b as shown in FIG. 10 may be provided to the noise absorbing member 5 in a portion where the locking member 7 is disposed.

In the above-described noise reduction device 4, while the band member 6 is formed of the thermoplastic resin, the noise absorbing member 5 is disposed between the band member 6 and the locking members 7, and then the locking members 7 are bonded to the band member 6 through the noise absorbing member 5 by thermal fusion. Accordingly, even when the noise absorbing member 5 are formed of a thermosetting resin, such as polyurethane foam, it is possible to firmly fix the noise absorbing member 5 to the band member 6. The fixation by thermal fusion bonding does not cause a reduction in adhesive force due to decomposition reaction, unlike the fixation by using an adhesive agent or an adhesive tape. For this reason, it is possible to improve the adhesion of the noise absorbing member 5 formed of the porous material. In addition, since the processing by thermal fusion bonding can be completed for a shorter time than the processing by using an adhesive agent, it is possible to reduce time taken for processing the noise reduction device 4.

Moreover, the pneumatic tire provided with the noise reduction device 4 in the cavity portion makes it possible to obtain an excellent noise reduction effect with the noise absorbing member 5. Furthermore, it is possible to maintain the noise reduction effect over a long period of time.

Figure 11:
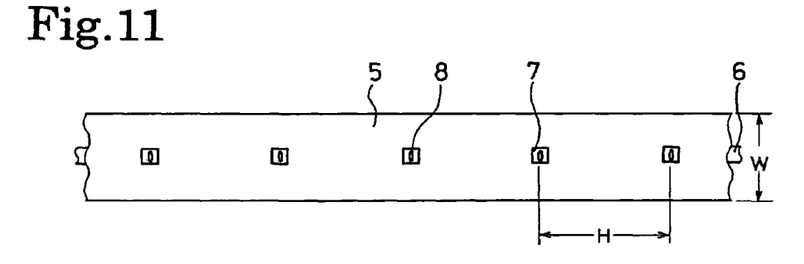
FIG. 11 is a plan view showing a state where the noise reduction device is expanded on the plane.

FIG. 11 shows a state where the noise reduction device is expanded on the plane. As shown in FIG. 11, the thermal-fusion-bonding portions 8 of the locking members 7 and the band member 6 may be arranged at intervals (pitches) in the tire circumferential direction, and the relation between the interval H and the width W of the noise absorbing member 5 may be $0.2 \text{ W} \leq H \leq 4 \text{ W}$. When the relation is $0.2 \text{ W} > H$, the workability at the time of thermal fusion bonding is deteriorated. When the relation is $H > 4 \text{ W}$, the bonding state of the noise absorbing member 5 to the band member 6 is unstable. Here, the thermal-fusion-bonding portions 8 may not necessarily be arranged at equal intervals.

Figure 12:
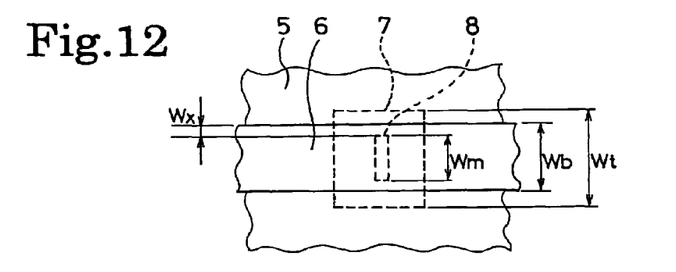
FIG. 12 is a plan view showing a detail of the noise reduction device.

FIG. 12 shows a detail of the noise reduction device. As shown in FIG. 12, the width Wt of each locking member 7 may be set at 90 to 300% of the width Wb of the band member 6. The width Wm of each of the thermal-fusion-bonding portions 8 of the locking members 7 and the band member 6 may be made narrower than the width Wb of the band member 6, so that non-fusion-bonding portions are left on both sides of each thermal-fusion-bonding portion 8 in the width direction thereof. The width Wx of each non-fusion-bonding portion may be set at 5 to 20% of the width Wb of the band member 6. When the width Wt of each locking member 7 is less than 90% of the width Wb of the band member 6, the fixation of the noise absorbing member 5 is insufficient. When the width Wt is more than 300% thereof, the operation of thermal fusion bonding is difficult. In addition, when the width Wx of each non-bonding portion is less than 5% of the width Wb of the band member 6, the strength of the band member 6 is insufficient. When the width Wx is more than 20% thereof, the fixation of the noise absorbing member 5 is insufficient. Incidentally, the thickness of each locking member 7 may be in a range from 20 to 150% of the thickness of the band member.

Figure 13:
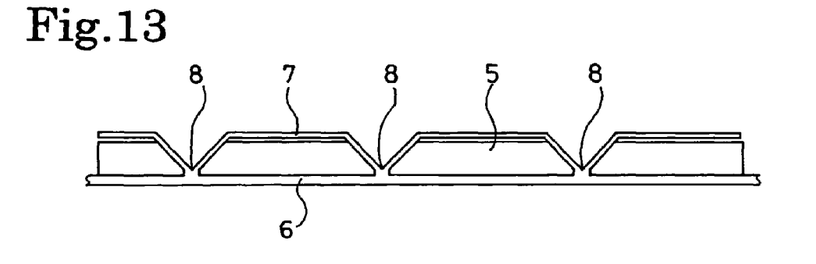
FIG. 13 is a cross-sectional view showing a state where a modified example of the noise reduction device is expanded on the plane.
Figure 14:
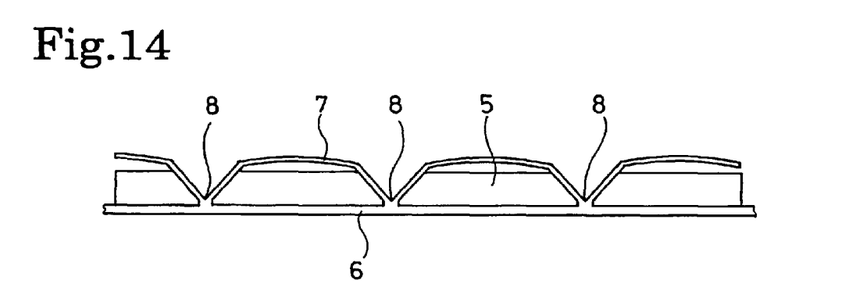
FIG. 14 is a cross-sectional view showing a state where a modified example of the noise reduction device is expanded on the plane.

Each of FIGS. 13 and 14 shows a state where a modified example of the noise reduction device is expanded on the plane. In FIG. 13, the locking member 7 extends continuously along the band member 6, and is fixed to the band member 6 with a plurality of the thermal-fusion-bonding portions 8. In FIG. 14, although the locking member 7 extends continuously along the band member 6 as in the same manner as that in FIG. 13, the locking member 7 has some extra length for allowance.

Figure 15:
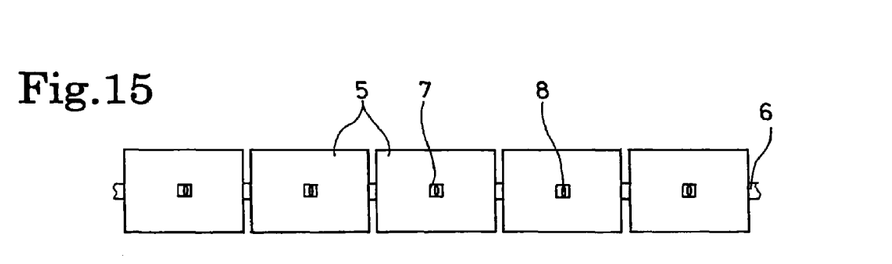
FIG. 15 is a plan view showing a state where a modified example of the noise reduction device is expanded on the plane.
Figure 16:
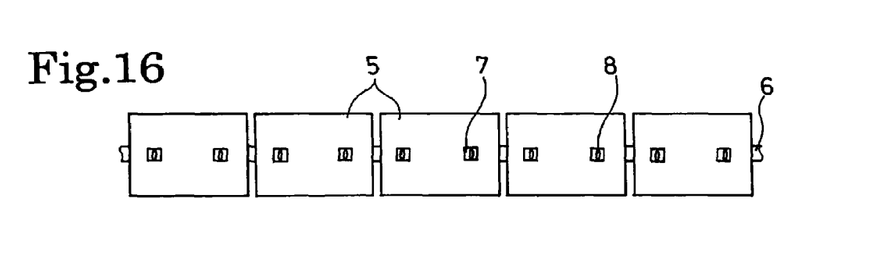
FIG. 16 is a plan view showing a state where a modified example of the noise reduction device is expanded on the plane.

Each of FIGS. 15 and 16 shows a state where a modified example of the noise reduction device is expanded on the plane. As shown in FIGS. 15 and 16, it is possible that the noise absorbing member 5 comprises a plurality of divided pieces, and the pieces are arranged in the longitudinal direction of the band member 6. In this case, it is preferable that each piece of the noise absorbing member 5 be bonded to the band member 6 by thermal fusion in at least 2 positions.

Figure 17:
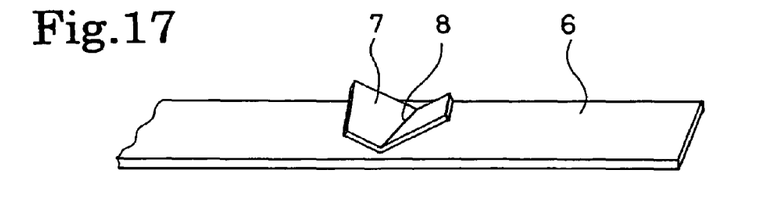
FIG. 17 is a perspective view showing a modified example of the noise reduction device.

FIG. 17 shows another modified example of the noise reduction device. Incidentally, in FIG. 17, the description of the noise absorbing member is omitted. In FIG. 17, the plate-shaped locking member 7 is bonded to the band member 6 by thermal fusion but the thermal-fusion-bonding portion is formed obliquely with respect to the longitudinal direction of the band member 6. In this case, since the thermal-fusion-bonding portion 8 is made longer, the durability can be improved.

Figure 18:
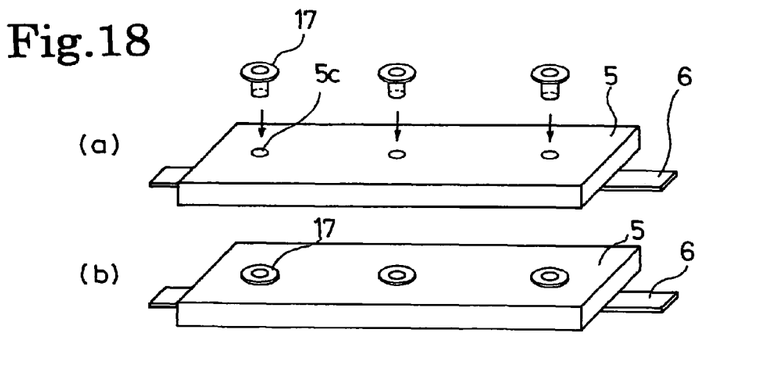
FIG. 18 show a noise reduction device using cylindrical locking members.

FIGS. 18(a) and 18(b) show another modified example of the noise reduction device. In FIGS. 18(a) and 18(b), the noise absorbing member 5 is disposed between the band member 6 and locking members 17 formed of a thermoplastic resin, and each locking member 17 is bonded to the band member 6 through the noise absorbing member 5 by thermal fusion. Each locking member 17 has a cylindrical shape with a bottom, and is provided with a flange on the open end side thereof. On the other hand, through holes 5c are formed in advance in the noise absorbing member 5 at positions where the noise absorbing member 5 is to be locked by the locking members 17. Each through hole 5c has a shape into which the shape of the locking member 17 fits. In the case of using the cylindrical locking members 17 each having no sharp edge portion or corner, the noise absorbing member 5 formed of the porous material is less likely to be damaged.

Figure 19:
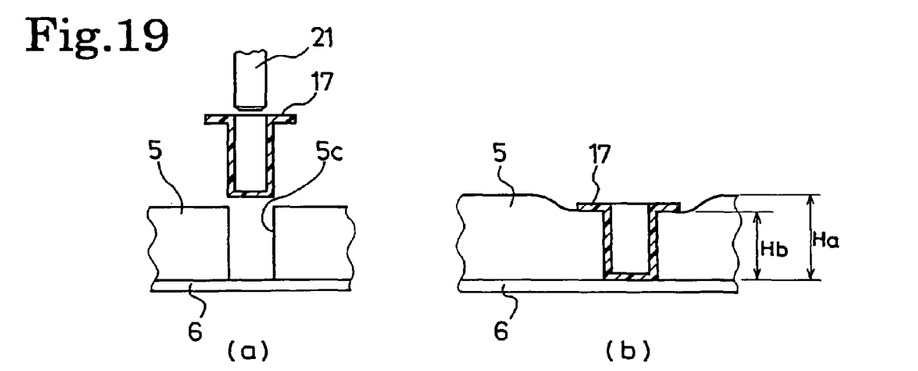
FIG. 19 show an example of a method of thermal fusion bonding between the cylindrical locking member and the band member, and each of FIGS. 19(a) and 19(b) is a cross-sectional view showing a step of the method.

FIGS. 19(a) and 19(b) show an example of a method of thermal fusion bonding between the cylindrical locking member and the band member. Firstly, as shown in FIG. 19(a), the cylindrical locking member 17 is inserted into the through hole 5c of the noise absorbing member 5, and then an oscillating horn 21 for an ultrasonic welder is pressed against the bottom portion of the locking member 17, so that the bottom portion is locally heated. The pressing surface of the oscillating horn 21 is circular. In this manner, as shown in FIG. 19(b), the locking member 17 is bonded to the band member 6 through the noise absorbing member 5 by thermal fusion. At this time, it is preferable that the noise absorbing member 5 be held in the state of being compressed by the locking member 17. In this case, the ratio (Hb/Ha) of the height Hb of the compressed portion of the noise absorbing member 5 to the height Ha of the noise absorbing member in a normal state may preferably be not more than 0.8, and more preferably be not more than 0.5.

Figure 20:
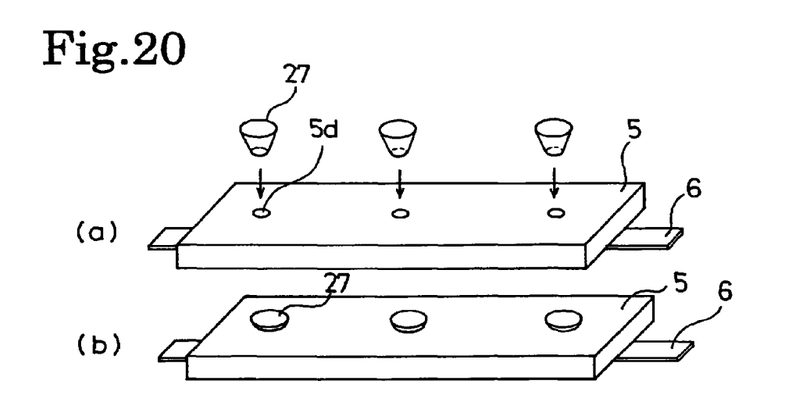
FIG. 20 show a noise reduction device using frusto-conical cylindrical locking members.

FIGS. 20(a) and 20(b) show another modified example of the noise reduction device. In FIGS. 20(a) and 20(b), the noise absorbing member 5 is disposed between the band member 6 and locking members 27 formed of a thermoplastic resin, and the locking members 27 are bonded to the band member 6 through the noise absorbing member 5 by thermal fusion. Each locking member 27 has a frusto-conical cylindrical shape with a bottom. In each locking member 27, the diameter at the open end side is larger than the diameter at the bottom side. On the other hand, through holes 5d, each of which is slightly narrower than the size of each locking member 27, is formed in advance in the noise absorbing member 5 at positions where the noise absorbing member 5 is locked by the locking members 27. In the case of using the frusto-conical cylindrical locking members 27 each having no sharp edge portion or corner, the noise absorbing member 5 formed of the porous material is less likely to be damaged.

Figure 21:
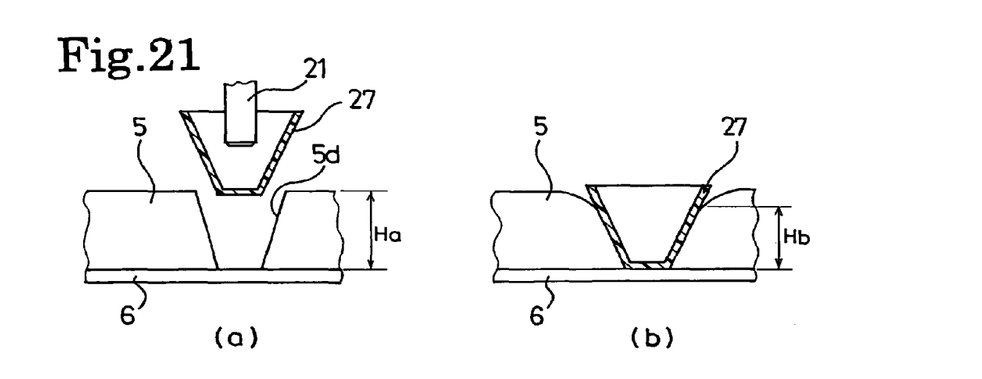
FIG. 21 show an example of a method of thermal fusion bonding between the frusto-conical cylindrical locking member and the band member. Each of FIGS. 21(a) and 21(b) is a cross-sectional view showing a step of the method.
Figure 22:
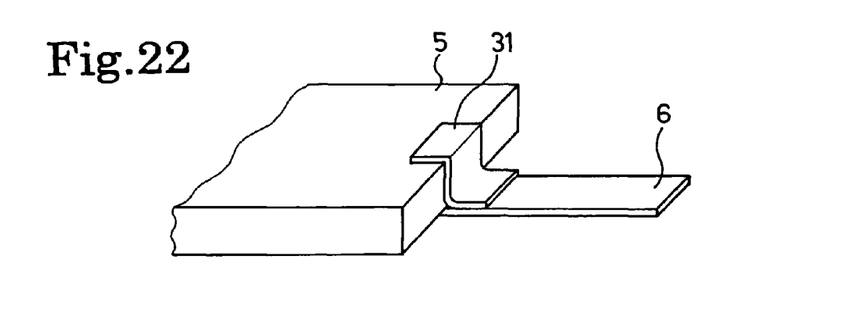
FIG. 22 is a perspective view showing a noise reduction device using a fastener for retaining the edge portion of the noise absorbing member formed of the porous material.
Figure 23:
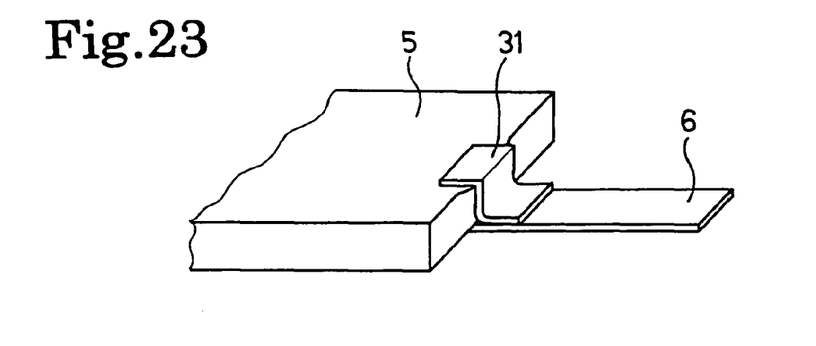
FIG. 23 is a perspective view showing a noise reduction device using a fastener for retaining the edge portion of the noise absorbing member formed of the porous material.
Figure 24:
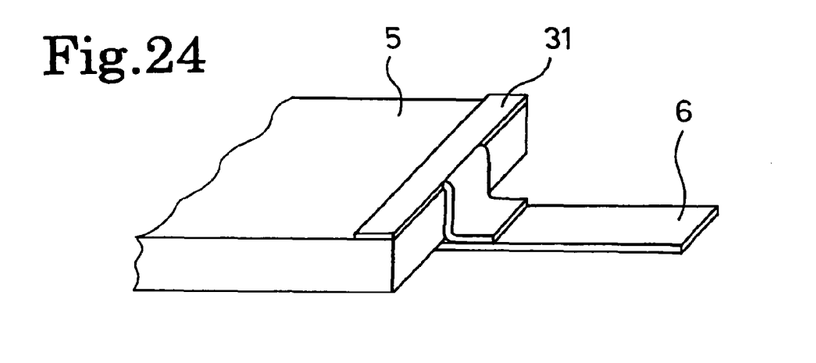
FIG. 24 is a perspective view showing a noise reduction device using a fastener for retaining the edge portion of the noise absorbing member formed of the porous material.
Figure 25:
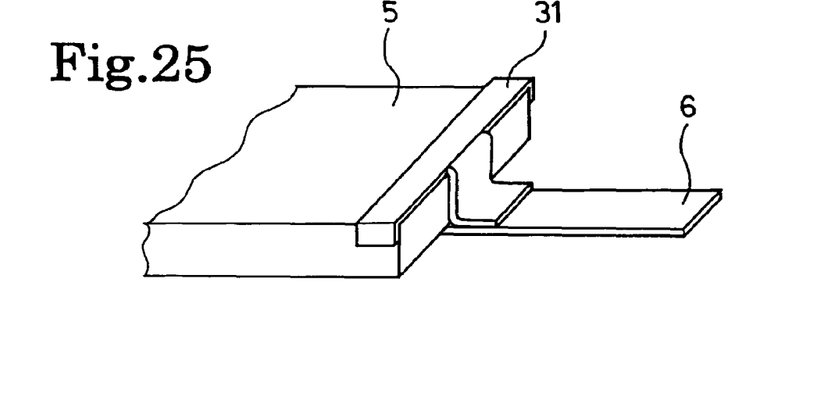
FIG. 25 is a perspective view showing a noise reduction device using a fastener for retaining the edge portion of the noise absorbing member formed of the porous material.

FIGS. 21(a) and 21(b) show an example of a method of thermal fusion bonding between the frusto-conical cylindrical locking member and the band member. Firstly, as shown in FIG. 21(a), the frusto-conical cylindrical locking member 27 is inserted into the through hole 5d of the noise absorbing member 5, then the oscillating horn 21 for the ultrasonic welder is pressed against the bottom portion of the locking member 27, and the bottom portion is locally heated. In this manner, as shown in FIG. 21(b), the locking member 27 is bonded to the band member 6 through the noise absorbing member 5 by thermal fusion. At this time, it is preferable that the noise absorbing member 5 be held in the state of being compressed by the locking member 27. The ratio (Hb/Ha) of the height Hb of the compressed portion of the noise absorbing member 5 to the height Ha of the noise absorbing member in a normal state may also preferably be not more than 0.8, and more preferably be not more than 0.5.

Figure 26:
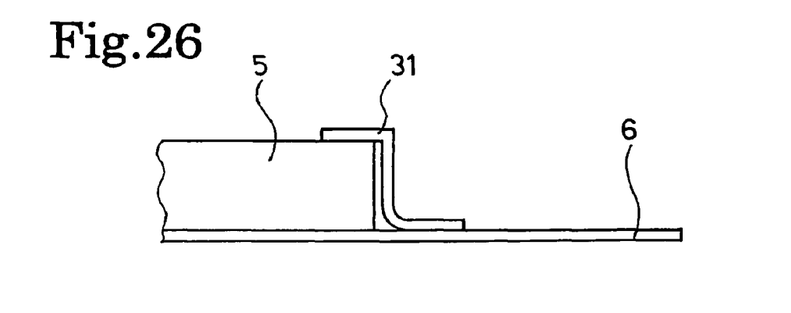
FIG. 26 is a side view showing a noise reduction device using a fastener for retaining the edge portion of the noise absorbing member formed of the porous material.

Each of FIGS. 22 to 26 shows another modified example of the noise reduction device. In each of FIGS. 22 to 25, the edge portion of the noise absorbing member 5 is forced down by a fastener 31 formed of a thermoplastic resin, and the fastener 31 is bonded to the band member 6 by thermal fusion. The shape of the fastener 31 is not particularly limited, and may be one of various shapes as shown in the figures. The edge portions of the noise absorbing member 5 tend to move during the rolling of the tire, but suppressing the movement of the portions with the fastener 31 makes it possible to prevent the noise absorbing member 5 from being destructed. Moreover, as shown in FIG. 26, it is preferable that a gap is provided between the fastener 31 and the noise absorbing member 5. This makes it possible to avoid interference between the fastener 31 and the noise absorbing member 5.

Figure 27:
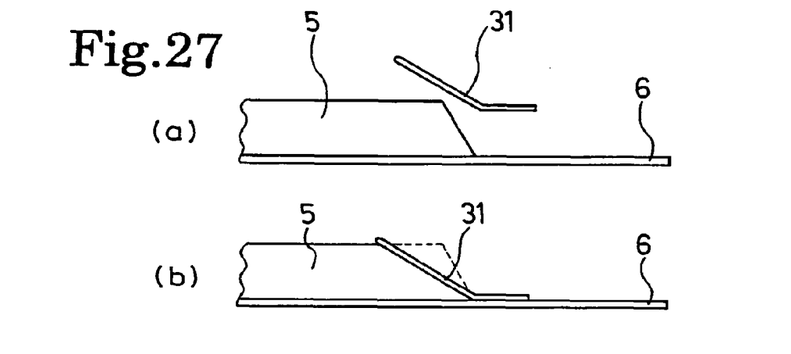
FIG. 27 show an example of a method of thermal fusion bonding between the fastener and the band member, and each of FIGS. 27(a) and 27(b) is a side view showing a step of the method.

FIGS. 27(a) and 27(b) show an example of a method of thermal fusion bonding between the fastener and the band member. As shown in FIG. 27(a), as the fastener 31, one having an angle larger than the inclination angle of the side wall of the noise absorbing member 5 may be used. In this case, as shown in FIG. 27(*b*), when being bonded to the band member 6 by thermal fusion, the fastener 31 holds the noise absorbing member 5 in a compressed state.

Figure 28:
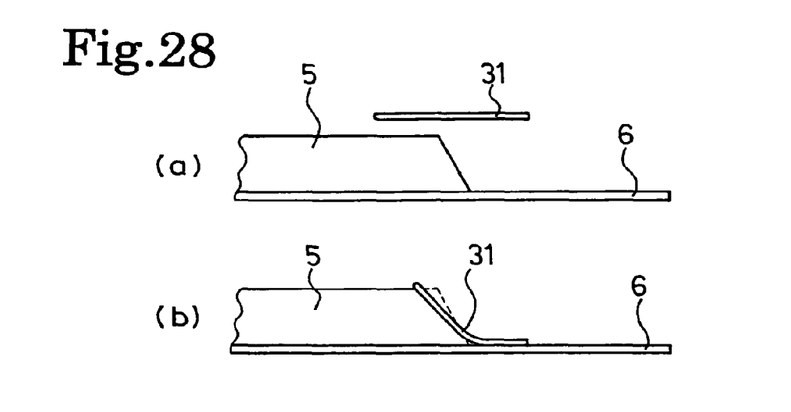
FIG. 28 show another example of the method of thermal fusion bonding between the fastener and the band member, and each of FIGS. 28(a) and 28(b) is a side view showing a step of the method.

FIGS. 28(*a*) and 28(*b*) show another example of a method of thermal fusion bonding between the fastener and the band member. As shown in FIG. 28(*a*), as the fastener 31, a simple plate-shaped one may be used. In this case, as shown in FIG. 28(*b*), when being bonded to the band member 6 by thermal fusion, the fastener 31 holds the noise absorbing member 5 in a compressed state while being elastically deformed.

Descriptions have been given above in detail of the preferred embodiments of the present invention. It should be understood that various modifications, alternations and substitutions can be made on the embodiments as long as not departing from the spirit and the scope of the present invention, which are defined by the scope of the appended claims

EXAMPLES

Noise reduction devices of Conventional Example, as well as Examples 1 and 2 were prepared. The noise reduction device of Conventional Example was prepared as follows. A noise absorbing member formed of band-shaped urethane foam (a width of 150 mm by a thickness of 20 mm) was fixed to a band member formed of polypropylene (a width of 20 mm by a thickness of 2 mm by a length equal to that of the inner periphery of the tire) by using an adhesive agent. Then the band member was formed into a circular shape. On the other hand, the noise reduction device of Example 1 was prepared as follows. A noise absorbing member formed of band-shaped urethane foam (a width of 150 mm by a thickness of 20 mm) was disposed on a band member formed of polypropylene (a width of 20 mm by a thickness of 2 mm by a length equal to that of the inner periphery of the tire). Then, by using an ultrasonic welder, plate-shaped locking members formed of polypropylene, which are arranged along the longitudinal direction of the noise absorbing member at intervals of approximately 200 mm, were bonded to the band member by thermal fusion. The noise reduction device of Example 2 was prepared in the same manner as that of Example 1, except that frusto-conical cylindrical locking members were used.

Each of the noise reduction devices of Conventional Example as well as Examples 1 and 2 was installed in a pneumatic tire having a tire size of 215/55R16, and was then caused to run by using a drum testing machine under the conditions of an internal pressure of 150 kPa and a speed of 80 km/h, so that the distance for which the tire ran until the noise absorbing member was detached was measured. The results of the tests are shown in Table 1. The evaluation results are indicated by indices where the evaluation result of Conventional Example is taken as 100. The larger the index is, the more favorable the durability of the tire is.

TABLE 1

|  | Conventional Example | Example 1 | Example 2 |
|---|---|---|---|
| Intervals of thermal-fusion-bonding portions (mm) | — | 200 | 200 |
| Running Distance (Index) | 100 | 178 | 219 |

As is clear from Table 1, the noise reduction devices of Examples 1 and 2 were significantly improved in the durability as compared with that of Conventional Example.

What is claimed is:

1. A pneumatic tire comprising a noise reduction device in a cavity portion thereof, the noise reduction device having:
   a noise absorbing member formed of a porous material;
   a band member for attaching the noise absorbing member to the inner surface of a tire; and
   locking members formed of a thermoplastic resin,
   wherein:
   the band member is formed of a thermoplastic resin,
   the noise absorbing member is disposed between the band member and the locking members,
   the locking members are bonded to the band member through the noise absorbing member by thermal fusion, and
   the constituent material of the band member and the constituent material of the locking members are the same thermoplastic resin.

2. The pneumatic tire according to claim 1, wherein the constituent material of the band member and the constituent material of the locking members are polypropylene.

3. The pneumatic tire according to claim 1, wherein the porous material of the noise absorbing member is polyurethane foam.

4. The pneumatic tire according to claim 1, wherein each locking member has a plate shape.

5. The pneumatic tire according to claim 1, wherein each locking member has a cylindrical shape with a closed bottom.

6. The pneumatic tire according to claim 1, wherein through holes are formed in the noise absorbing member at positions where the noise absorbing member is locked by the locking members.

7. The pneumatic tire according to claim 2, wherein through holes are formed in the noise absorbing member at positions where the noise absorbing member is locked by the locking members.

8. The pneumatic tire according to claim 6, wherein the noise absorbing member is held in the state of being compressed by the locking members when the locking members are bonded to the band member via the through holes by thermal fusion.

9. The pneumatic tire according to claim 7, wherein the noise absorbing member is held in the state of being compressed by the locking members when the locking members are bonded to the band member via the through holes by thermal fusion.

10. The pneumatic tire according to claim 1, wherein an edge portion of the noise absorbing member is retained by a fastener formed of a thermoplastic resin, and then the fastener is bonded to the band member by thermal fusion.

11. The pneumatic tire according to claim 2, wherein an edge portion of the noise absorbing member is retained by a fastener formed of a thermoplastic resin, and then the fastener is bonded to the band member by thermal fusion.

12. The pneumatic tire according to claim 1, wherein:
    the width of each locking member is 90 to 300% of the width of the band member,
    the width of a thermal-fusion-bonding portion where each locking member is bonded to the band member by thermal fusion is made narrower than the width of the band member, and
    non-fusion-bonding portions, each having a width equivalent to 5 to 20% of the width of the band member, are left on both sides of the thermal-fusion-bonding portion.

13. The pneumatic tire according to claim 2, wherein:
    the width of each locking member is 90 to 300% of the width of the band member, the width of a thermal-fusion-bonding portion where each locking member is bonded to the band member by thermal fusion is made narrower than the width of the band member, and non-fusion-bonding portions, each having a width equivalent to 5 to 20% of the width of the band member, are left on both sides of the thermal-fusion-bonding portion.

14. The pneumatic tire according to claim 1, wherein:

the thermal-fusion-bonding portions of the locking members and the band member are arranged at intervals in the tire circumferential direction, and the relation between the interval H and the width W of the noise absorbing member is 0.2 W≤H≤4 W.

15. The pneumatic tire according to claim 5, wherein each of said locking members comprises a right cylinder with an enlarged annular flange on an open upper end thereof.

16. The pneumatic tire according to claim 5, wherein each of said locking members comprises a frusto-conical cylinder with an open upper end thereof.

17. The pneumatic tire according to claim 1, wherein the width of each of said locking members is less than the width of said noise absorbing member, and further wherein the noise absorbing member is locked to said band member by said locking members such that the noise absorbing member is exposed.

18. The pneumatic tire according to claim 1, wherein:

the noise absorbing member is disposed between an upper surface of the band member and the locking members;

at least some of the locking members are surrounded in both the width direction and the circumferential direction by the noise absorbing member; and the locking members are bonded to the upper surface of the band member.

19. The pneumatic tire according to claim 1, wherein the noise absorbing member comprises a single ring-shaped member.

\* \* \* \* \*